United States Patent [19]

Steinert

[11] Patent Number: 4,760,399

[45] Date of Patent: Jul. 26, 1988

[54] METHOD FOR GENERATING ANTENNA FOLLOW-UP SIGNALS

[75] Inventor: Wolfgang Steinert, Backnang, Fed. Rep. of Germany

[73] Assignee: ANT Nachrichtentechnik GmbH, Backnang, Fed. Rep. of Germany

[21] Appl. No.: 868,109

[22] Filed: May 29, 1986

[30] Foreign Application Priority Data

May 31, 1985 [DE] Fed. Rep. of Germany ....... 3519529

[51] Int. Cl.$^4$ ............................................. G01S 03/22
[52] U.S. Cl. ..................................... 342/427; 342/149
[58] Field of Search ............... 342/427, 359, 149, 150, 342/151, 152, 153, 154

[56] References Cited

U.S. PATENT DOCUMENTS

| 2,547,890 | 4/1951 | Rubin . | |
|---|---|---|---|
| 3,341,845 | 9/1967 | Deman | 342/49 |
| 3,438,044 | 4/1969 | Elia et al. | 342/427 |
| 3,758,880 | 9/1973 | Mörz . | |
| 3,761,927 | 9/1973 | Amoroso, Jr. . | |
| 4,103,304 | 7/1978 | Burnham et al. | 342/427 |
| 4,136,343 | 1/1979 | Heffner et al. | 342/427 |
| 4,213,130 | 7/1980 | Vaessen | 342/427 |
| 4,215,347 | 7/1980 | Jarrell et al. | 342/417 |
| 4,578,679 | 3/1986 | Mörz . | |

FOREIGN PATENT DOCUMENTS 0093234  11/1983  European Pat. Off. .
WO84/03360  8/1984  World Int. Prop. O. .

OTHER PUBLICATIONS

"1 Kanal-14 Monopulssystem für eine einfache Antennennachführung", Wolfgang Steinert, in Nachrichtentechnische Zeitschrift N.T.Z. 38 (1985).

Primary Examiner—Thomas H. Tarcza
Assistant Examiner—Mark Hellner
Attorney, Agent, or Firm—Spencer & Frank

[57] ABSTRACT

A method for producing antenna follow-up signals in which a sum signal and a difference signal are derived from a received beacon signal and an amplitude modulated signal is produced by superposition from these two signals. The amplitude modulated signal is converted into another frequency by means of a mixer which receives both the amplitude modulated signal and a mixing signal. The converted amplitude modulated signal is fed to an amplitude detector via a narrow-band bandpass filter which permits only the signal frequency to pass. A voltage controlled oscillator is cyclically switched to produce a mixing signal which is fed to the mixer and which cyclically changes its frequency between two frequencies for the duration of each phase state of the difference signal. The converted signal at the output of the mixer changes its frequency between two further frequencies in response to the change of frequency of the mixing signal. The frequency of the voltage controlled oscillator is controlled with a control voltage that is derived from a difference between attenuations suffered by the converted amplitude modulated signal in the bandpass filter at the two further frequencies of such converted signal.

3 Claims, 4 Drawing Sheets

METHOD FOR GENERATING ANTENNA FOLLOW-UP SIGNALS

BACKGROUND OF THE INVENTION

The present invention relates to a method for generating antenna follow-up signals to track another antenna which transmits a beacon signal, wherein a sum signal and at least one difference signal are derived in a mode coupler from the beacon signal received by the movable antenna. The difference signal is subjected to cyclical changes in phase and, while traversing the different phase states, is superposed on the sum signal to form an amplitude modulated signal. Finally a determination is made as to whether the amplitude modulated signal produced by the superposition of the difference signal and the sum signal undergoes a positive or negative change in amplitude when the difference signal goes from one phase state to another and the amount by which the amplitude modulated signal changes. Such a method for producing antenna follow-up signals is disclosed in European patent application EP No. 0,093,234.A1.

In satellite transmission systems it is desirable to provide follow-up devices which are as simple and compact as possible. This is particularly important for the antennas of satellites and also for the antennas of small ground stations which are installed close to users.

SUMMARY OF THE INVENTION

It is an object of the present invention to provide a method for generating antenna follow-up signals of the abovementioned type which can be realized simply and compactly.

The above and other objects of the invention are accomplished in the context of a method as described above and further including the steps of: converting the amplitude modulated signal into another frequency by means of a mixer which receives the amplitude modulated signal and a mixing signal; feeding the converted amplitude modulated signal to an amplitude detector via a narrowband bandpass filter which permits only the frequency of the converted signal to pass, the amplitude detector producing an output signal corresponding to the amplitude of the amplitude modulated signal; cyclically switching a voltage controlled oscillator to produce a signal which cyclically changes its frequency between two frequencies for the duration of each phase state of the difference signal and feeding the signal produced by the voltage controlled oscillator to the mixer as the mixing signal, the converted signal at the output of the mixer changing its frequency between two further frequencies in response to the change of frequency of the mixing signal; and controlling the voltage controlled oscillator with a control voltage that is derived from a difference between attenuations suffered by the converted amplitude modulated signal in the bandpass filter at the two further frequencies of such converted signal.

The invention will be described in greater detail below in conjunction with the accompanying drawings.

DETAILED DESCRIPTION OF THE PREFERRED EMBODIMENTS

The monopulse method disclosed, for example, in the aforemention European patent application is utilized to determine follow-up signals that indicate the deviation of an antenna from another target antenna. For this purpose, the target antenna sends either a linearly or a circularly polarized beacon signal to the antenna to be adjusted.

The antenna to be adjusted has two different radiation diagrams, namely a so-called sum diagram and a difference diagram. The sum diagram, i.e. the radiation diagram of, for example, the $H_{10}$ mode, has a field intensity maximum in the electrical axis of the antenna and is symmetrical to both sides of the axis. In contrast thereto, the difference diagram, i.e. the radiation diagram of, for example, the $H_{20}$, $H_{11}$, $E_{11}$ or the $H_{01}$ mode, has a zero position in the electrical axis and is symmetrical to both sides in phase opposition.

A so-called mode coupler, for example as disclosed in U.S. Pat. No. 3,758,880, couples out, separately from one another, wave modes having different radiation diagrams and provides at its outputs a sum signal $\Sigma$ and a difference signal $\Delta$, whose powers P, as a function of the angle of deviation $\Theta$ between the antenna axis and the incoming beacon signal, have the shape shown by the solid lines in FIG. 1. The mode coupler of U.S. Pat. No. 3,758,880 delivers two mutually independent difference signals $\Delta X$ and $\Delta Y$ at two orthogonally oriented pairs of waveguide arms, if the received beacon signal is linear polarized, and it delivers one difference signal $\Delta$ at at least one of the waveguide arms, if the received beacon signal is circular polarized.

Figure 2:
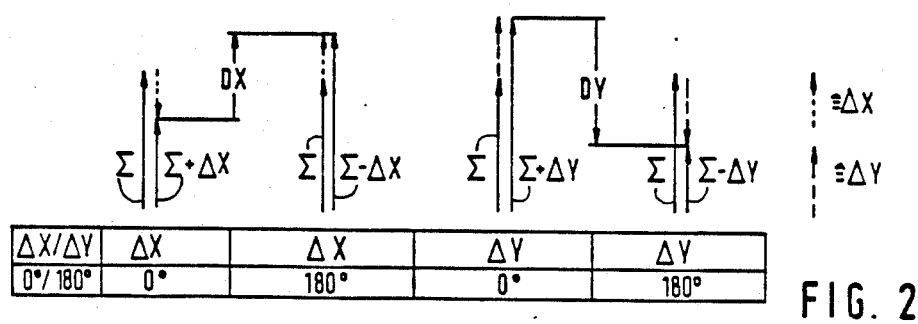
FIG. 2 is a vector diagram which shows the vectorial determination of an amplitude modulated signal for a linearly polarized beacon signal as used according to one aspect of the invention.
Figure 5:
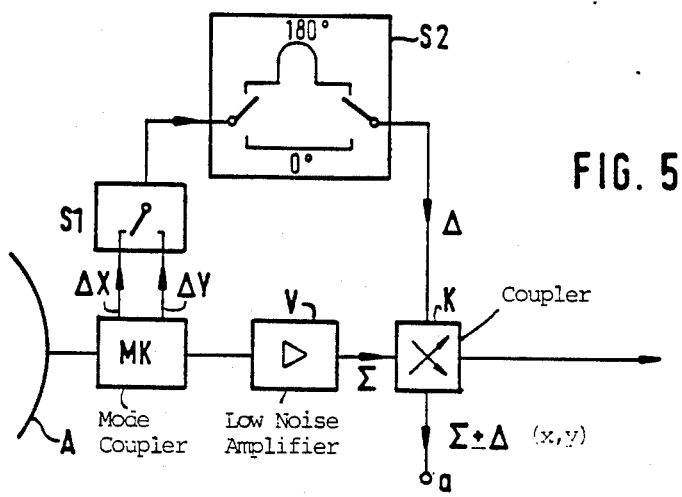
FIG. 5 is a block circuit diagram of a monopulse switching network for a linearly polarized beacon signal.

Initially a description is provided, with reference to FIGS. 2 and 5, of the derivation of follow-up signals when the tracking antenna receives a linearly polarized beacon signal. In this case, the mode coupler furnishes two mutually independent difference signals $\Delta X$ and $\Delta Y$ from which the deviation of the antenna in the azimuth direction (X) and in the elevation direction (Y) can be derived.

In a multiplex process the different difference signals $\Delta X$ and $\Delta Y$ are superposed on the sum signal $\Sigma$. An arrangement which performs this multiplexing process is shown in FIG. 5. Here, a switch S1, switches, for example, the difference signal $\Delta X$, made available by a mode coupler MK, to a second switch S2 which feeds the difference signal $\Delta X$ to a coupler K. Switch S2 feeds the difference signal $\Delta X$ in a first step directly and without a shift in phase to a coupler K, and in a second step via a detour line with a phase shift of 180° to coupler K. Coupler K superposes this difference signal $\Delta X$, as it passes through the two phase states 0° and 180°, on the sum signal $\Sigma$ which comes from a low noise amplifier V. Consequently, the signal $\Sigma+\Delta X$ and the signal $\Sigma-\Delta X$ are present in succession at an output a of coupler K (see vector diagram of FIG. 2). Then, switch S1 switches to the output of mode coupler MK which furnishes the difference signal $\Delta Y$, which is again fed by switch S2 to coupler K in a first step without a phase shift and in a second step with a shift in phase by 180° where it is superposed on sum signal $\Sigma$ so that the signals $\Sigma+\Delta Y$ and $\Sigma-\Delta Y$ appear in succession at output a of coupler K. The multiplex superposition of sum signal $\Sigma$ with the difference signals $\Delta X$ and $\Delta Y$ as described above produces an amplitude modulated signal (FIG. 4) at output a of coupler K.

Figure 1:
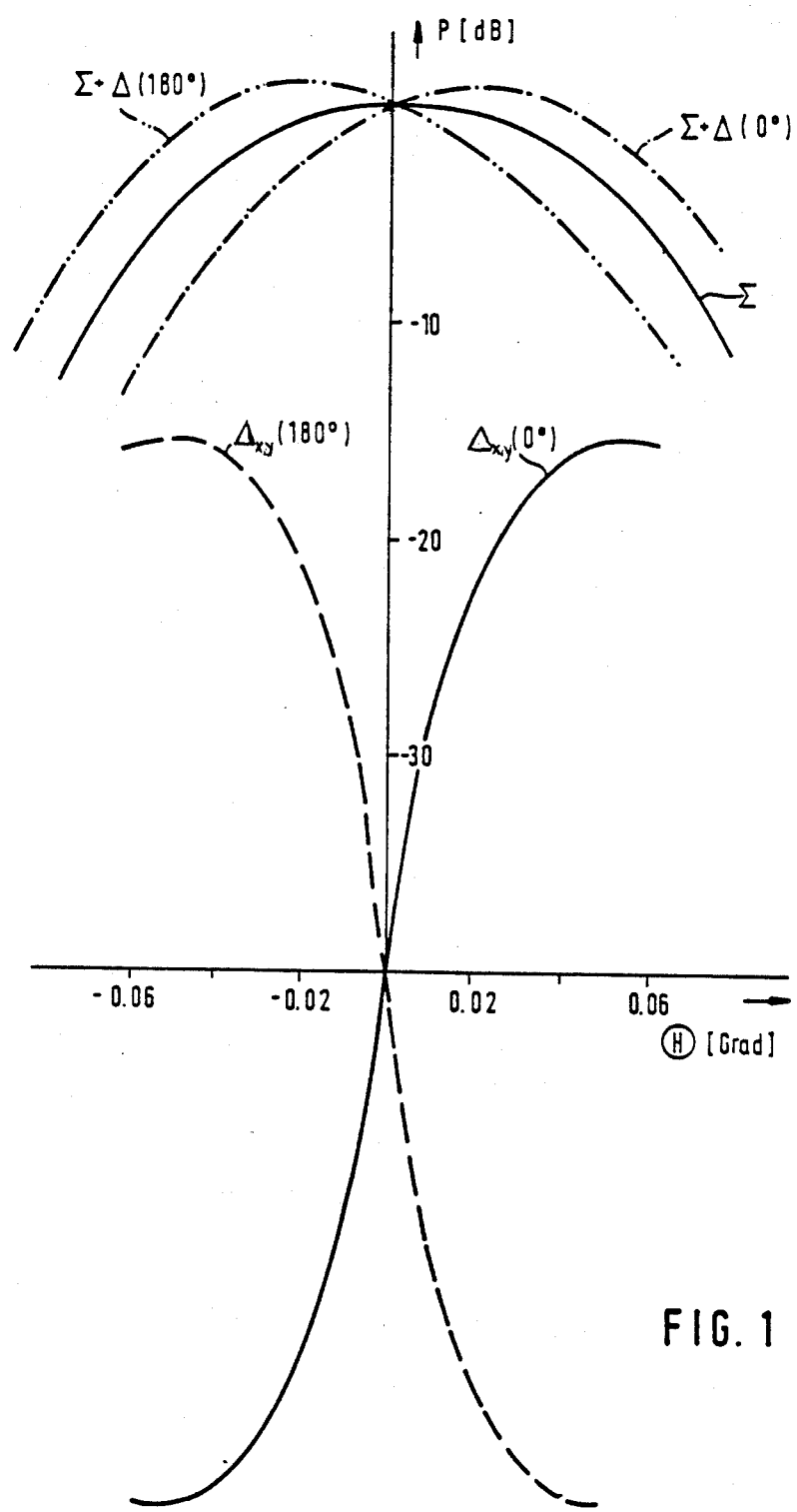
FIG. 1 is a signal diagram which shows sum and difference antenna signals used to explain the invention.

FIG. 1 shows, as a substitute for one of the two difference diagrams $\Delta X$ and $\Delta Y$, the difference diagram $\Delta_{x,y}$ in the 0° and in the 180° phase position. Additionally, FIG. 1 shows the diagrams $\Sigma+\Delta_{x,y}(0°)$ and $\Sigma+\Delta_{x,y}(180°)$, which result from the superposition of the sum diagram with the 0° phase shifted difference diagram $\Delta_{x,y}(0°)$ and the 180° phase shifted difference diagram $\Delta_{x,y}(180°)$. It can be seen here that the diagram $\Sigma+\Delta_{x,y}(0°)$ has greater levels for positive deviation angles Ⓗ than for corresponding negative deviation angles and, vice versa, diagram $\Sigma+\Delta_{x,y}(180°)$ has smaller levels for positive deviation angles Ⓗ then for corresponding negative deviation angles. Consequently, as is also shown by the vector diagram of FIG. 2, a negative deviation angle Ⓗ, for example, brings about, during a transition from signal $\Sigma+\Delta_{x,y}(0°)$ to signal $\Sigma+\Delta_{x,y}(180°)=\Sigma-\Delta_{x,y}(0°)$, a positive jump in power level, and a positive deviation angle H brings about a negative jump in power level. The sign of this jump in power level thus indicates the direction of the antenna deviation and the magnitude of the jump in power level indicates the amount of the antenna deviation. With a deviation angle of 0°, no jump in power level occurs since both diagrams $\Sigma+\Delta_{x,y}(0°)$ and $\Sigma+\Delta_{x,y}(180°)$ intersect at this point, in which the sum diagram has its maximum.

Figure 4:
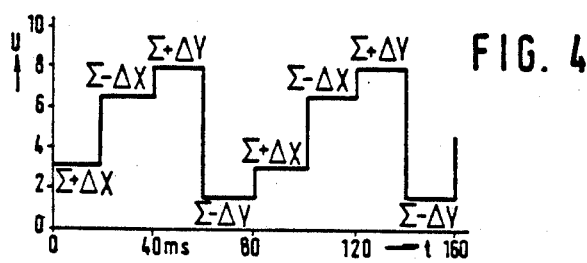
FIG. 4 is a signal diagram which shows an amplitude modulated signal derived from the sum signal and the difference signal.

As explained above, an amplitude modulated signal, an example of which is represented by amplitude curve U in FIG. 4, appears at output a of coupler K because of the multiplexed superposition of sum signal $\Sigma$ with the difference signals $\Delta X$ and $\Delta Y$, which pass through the phase states 0° and 180°. According to the statements above, the direction and amount of the antenna deviation are evident from the signs and amounts of the differences $Dx=(\Sigma+\Delta X)-(\Sigma-\Delta X)$ and $DY=(\Sigma+\Delta Y)-(\Sigma-\Delta Y)$. The differences Dx and Dy constitute follow-up signals which can be determined as will be discussed below in connection with FIG. 7.

If a circularly polarized beacon signal is received, the mode coupler emits a difference signal $\Delta$ which is produced by vectorial addition of two orthogonal difference signal components $\Delta X$ and $\Delta Y$. In a similar manner as for the reception of a linearly polarized beacon signal, an amplitude modulated signal is formed here by superposition of the sum signal $\Sigma$ and the difference signal $\Delta$, from which follow-up signals Dx and Dy can be derived. For this purpose, as shown by the vector diagram of FIG. 3, the difference signal $\Delta$ is cyclically shifted in phase by 0°, 180°, 90° and 270°, so that, in succession, in one phase state of difference signal $\Delta$, the difference signal components $\Delta X$ and $\Delta Y$ are in phase with the sum signal $\Sigma$ and in another phase state of difference signal $\Delta$ they are in phase opposition with sum signal $\Sigma$.

Figure 6:
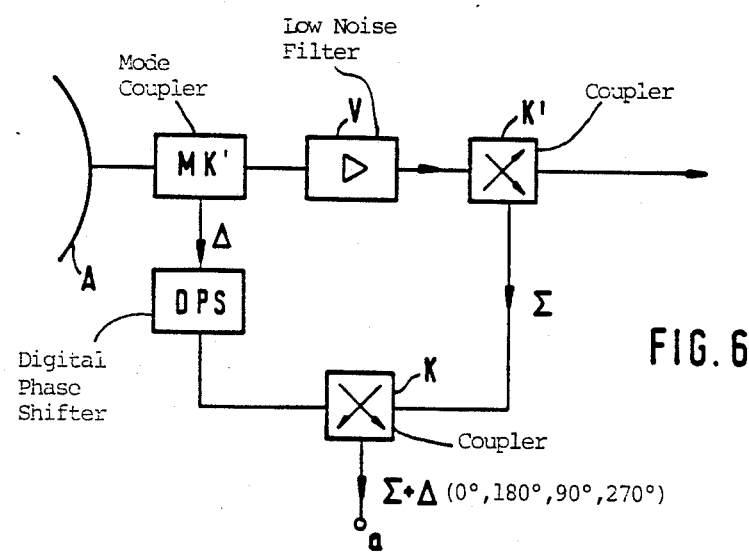
FIG. 6 is a block circuit diagram of a monopulse switching network for a circularly polarized beacon signal.

FIG. 6 is a block-circuit diagram for a monopulse receiver for a circularly polarized beacon signal. A mode coupler MK' couples the difference signal $\Delta$ out of the received circularly polarized beacon signal and then this difference signal $\Delta$ is cyclically put into the four phase states of 0°, 180°, 90°, and 270° with the aid of a digital phase shifter DPS. The sum signal $\Sigma$ which is coupled in from the useful signal path by a coupler K', is superposed on the difference signal $\Delta$ by means of a further coupler K so that at its outputs a there appears an amplitude modulated signal $\Sigma+\Delta$ whose amplitude curve takes, in succession, the values $\Sigma+\Delta(0°)$, $\Sigma+\Delta(180°)$, $\Sigma+\Delta(90°)$ and $\Sigma+\Delta(270°)$.

Thereafter, the amplitude of the amplitude modulated signal present at output a of the monopulse switching network is detected and from it the follow-up signals Dx and Dy for antenna A determined. A simple method for accomplishing this, with an extremely small amount of circuitry, will be explained with reference to the block-circuit diagram shown in FIG. 7.

Amplitude detection is here effected by means of an amplitude detector AM which may be composed, for example, of only one diode. The carrier signal of the amplitude modulated signal present at output a of the monpulse switching network is initially converted in a mixer M to a lower frequency suitable for the amplitude detector. Between mixer M and amplitude detector AM, there is inserted a bandpass filter BP which takes care that the signal to noise ratio of the signal fed to amplitude detector AM is as high as possible. To meet the requirement for a good signal to noise ratio, bandpass filter BP must be very narrowbanded. However, the frequency of the signal present at the output of mixer M is not so stable that it always coincides with the transmission range of the narrowband bandpass filter BP. Therefore a frequency control has to be performed. For this purpose, mixer M is actuated by the output signal of a voltage controlled oscillator VCO.

Frequency control is effected in that, during each amplitude stage of the amplitude modulated signal, i.e. during the duration of each phase state of the difference signal, the output frequency of the voltage controlled oscillator VCO is cyclically switched between two frequencies $fo+\Delta f$ and $fo-\Delta f$. At each one of the two frequencies f1 and f2, to which the signal in mixer M is converted due to the frequency switching of voltage controlled oscillator VCO, the amplitude modulated signal is attenuated to form attenuation signals A(f1), A(f2) in bandpass filter BP. As will be described in greater detail below, a control signal DF1 for voltage controlled oscillator VCO is derived from the difference between the two attenuation signals A(f1) and A(f2) which were produced at the two different frequencies f1 and f2. The difference between attenuation signals A(f1) and A(f2) becomes zero if the center frequency between the two frequencies f1 and f2 coincides with the center frequency of bandpass filter BP. In this case, attenuation signals A(f1) and A(f2) are identical due to the attenuation characteristic being symmetrical to the center frequency.

Figure 3:
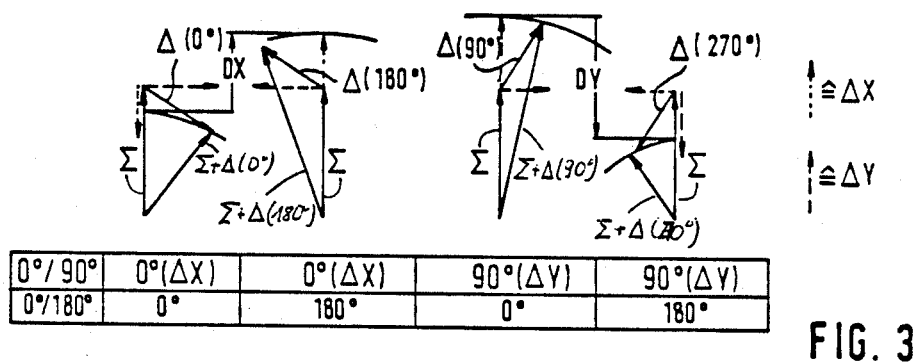
FIG. 3 is a vector diagram which shows the vectorial determination of an amplitude modulated signal for a circularly polarized beacon signal as used according to another aspect of the invention.

In order for the regulating slope of the frequency regulation to be constant, independently of the level of the input signal, the demodulated signal is logarithmized in a logarithmizing amplifier LOG connected to follow amplitude detector AM. At the output of logarithmizing amplifier LOG, the following amplitude stages U1 ... U8 then appear in succession, if one assumes that a circularly polarized beacon signal has been received:

$$U1 = \log [A(f1)] \cdot \sqrt{(\Sigma + \Delta X)^2 + \Delta Y^2},$$

wherein the term $\sqrt{(\Sigma+\Delta X)^2+\Delta Y^2}$ is derived from the vector addition of $\Sigma+\Delta(0°)$ (see vector diagram of FIG. 3). Therefore, $$U1 = \log \left[ A(f1) \cdot \Sigma \cdot \sqrt{1 + 2\frac{\Delta X}{\Sigma} + Kxy} \right],$$

where $$Kxy = \frac{\Delta X^2 + \Delta y^2}{\Sigma^2}.$$

Thus, $$U1 = \log [A(f1)] + \log [\Sigma] + \tfrac{1}{2}\log \left[ 1 + 2\frac{\Delta X}{\Sigma} + Kxy \right] \Bigg\} 0°$$

All other amplitude stages $U2 \ldots U8$ are calculated correspondingly.

$$U2 = \log [A(f2)] + \log [\Sigma] + \tfrac{1}{2}\log \left[ 1 + 2\frac{\Delta X}{\Sigma} + Kxy \right]$$

Phase of Difference Signal $$U3 = \log [A(f1)] + \log [\Sigma] + \tfrac{1}{2}\log \left[ 1 - 2\frac{\Delta X}{\Sigma} + Kxy \right] \Bigg\} 180°$$

$$U4 = \log [A(f2)] + \log [\Sigma] + \tfrac{1}{2}\log \left[ 1 - 2\frac{\Delta X}{\Sigma} + Kxy \right]$$

$$U5 = \log [A(f1)] + \log [\Sigma] + \tfrac{1}{2}\log \left[ 1 + 2\frac{\Delta X}{\Sigma} + Kxy \right] \Bigg\} 90°$$

$$U6 = \log [A(f2)] + \log [\Sigma] + \tfrac{1}{2}\log \left[ 1 + 2\frac{\Delta X}{\Sigma} + Kxy \right]$$

$$U7 = \log [A(f1)] + \log [\Sigma] + \tfrac{1}{2}\log \left[ 1 - 2\frac{\Delta X}{\Sigma} + Kxy \right] \Bigg\} 270°$$

$$U8 = \log [A(f2)] + \log [\Sigma] + \tfrac{1}{2}\log \left[ 1 - 2\frac{\Delta X}{\Sigma} + Kxy \right]$$

These amplitude stages U1 ... U8 are digitalized in an analog/digital converter AD and are transferred to a microprocessor MP for a calculation of the follow-up signals Dx, Dy and control signal DF1 for voltage controlled oscillator VCO according to the following relationships.

Control signal DF1 is derived from a frequency error signal DF, which is calculated as follows:

$$DF = \left\{ \begin{array}{c} U1 - U2 \\ U3 - U4 \\ U5 - U6 \\ U7 - U8 \end{array} \right\} = \log[A(f1)] - \log[A(f2)]$$

$$DR = \log \left[ \frac{A(f1)}{A(f2)} \right] \text{ is } \begin{array}{l} \text{positive} \\ 0 \\ \text{negative} \end{array} \begin{array}{l} \text{for } A(f1) > A(f2) \\ \text{for } A(f1) = A(f2) \\ \text{for } A(f1) < A(f2) \end{array}$$

The frequency error signal DF calculated by microprocessor MP is converted, for example by integration, to the control signal DF1 and this control signal DF1 is converted by a digital/analog converter DA to an analog signal and is then fed to voltage controlled oscillator VCO. The conversion of the frequency error signal DF to control signal DF1 can take place either in microprocessor MP or in a corresponding analog component following the digital/analog converter. The sign of the frequency error signal DF indicates in which direction the voltage controlled oscillator VCO must shift its two output frequencies fo+$\Delta$f and fo−$\Delta$f and the amplitude of the frequency error signal DF indicates to what extent the frequencies must be changed to make the converted output signal of mixer M fall into the transmission range of bandpass filter BP.

Follow-up signals Dx and Dy are calculated as follows:

$$DX = (U1 + U2) - (U3 + U4)$$

$$DX = \log \left[ \frac{1 + 2\frac{\Delta X}{\Sigma} + Kxy}{1 - 2\frac{\Delta X}{\Sigma} + Kxy} \right] \text{ is } \begin{array}{l} \text{positive} \\ 0 \\ \text{negative} \end{array} \begin{array}{l} \text{for } \Delta X > 0 \\ \text{for } \Delta X = 0 \\ \text{for } \Delta X < 0 \end{array}$$

$$DY = (U5 + U6) - (U7 + U8)$$

$$DY = \log \left[ \frac{1 + 2\frac{\Delta Y}{\Sigma} + Kxy}{1 - 2\frac{\Delta Y}{\Sigma} + Kxy} \right] \text{ is } \begin{array}{l} \text{positive} \\ 0 \\ \text{negative} \end{array} \begin{array}{l} \text{for } \Delta Y > 0 \\ \text{for } \Delta Y = 0 \\ \text{for } \Delta Y < 0 \end{array}$$

Figure 7:
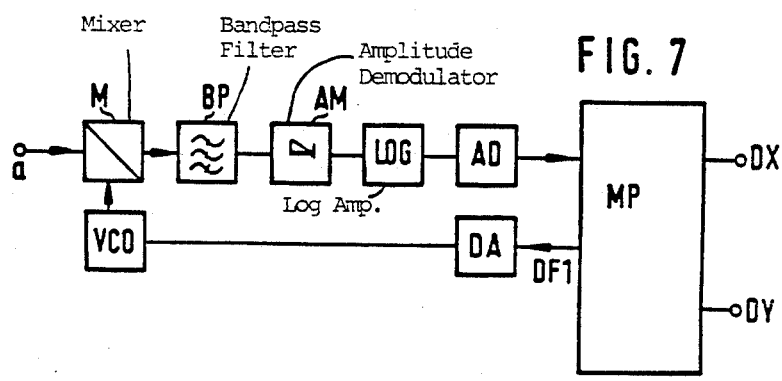
FIG. 7 is a block circuit diagram of an embodiment according to the invention for determining antenna follow-up signals.

The above-described method can also be used in multiplex operation to determine the follow-up signals of a plurality of antennas, which merely requires a circuit of the type shown in FIG. 7.

Figure 8:
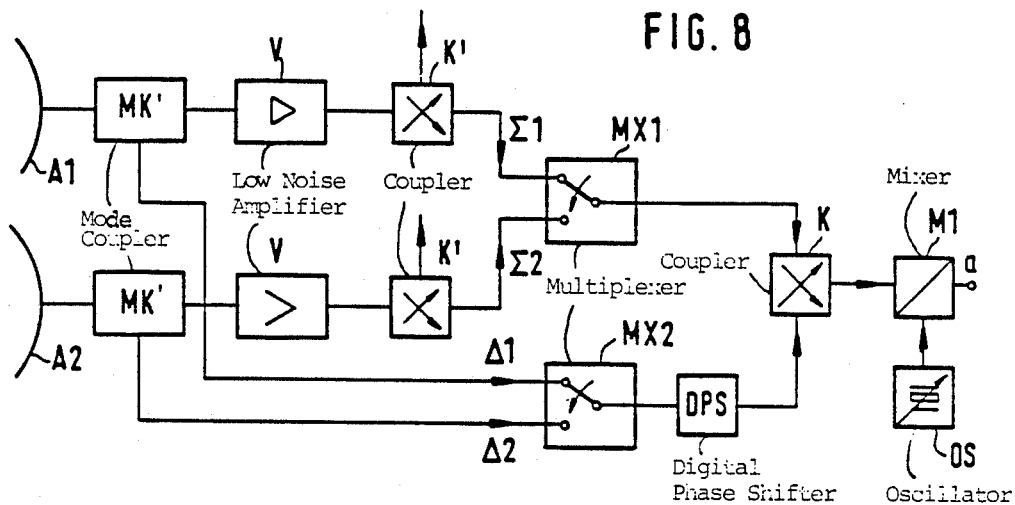
FIGS. 8 and 9 are two basic block circuit diagrams for a plurality of monopulse switching networks operated in time multiplex according to a further aspect of the invention.
Figure 9:
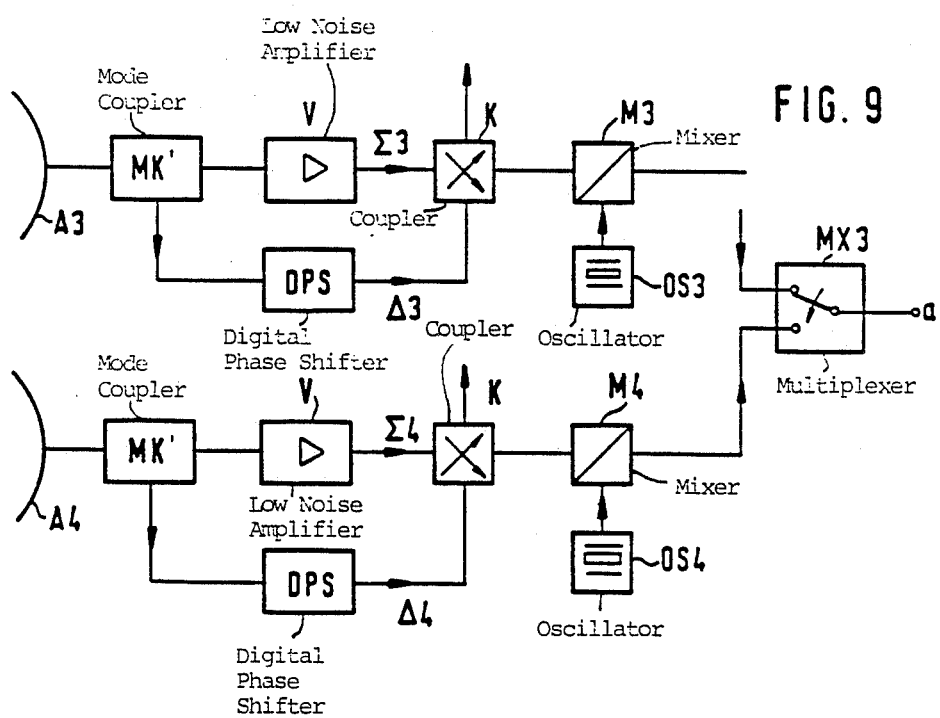

According to the embodiments shown in FIGS. 8 and 9, two antennas A1 and A2 as well as A3 and A4 and their monopulse switching networks are connected together. The monopulse switching networks include the components bearing the same reference numerals as the circuit shown in FIG. 6 for receiving a circularly polarized beacon signal.

In the circuit of FIG. 8, it is assumed that the frequencies of the beacon signals received by antennas A1 and A2 lie within a relatively narrow frequency range (e.g.—both around 30 GHz). In this case, sum signals $\Sigma 1$ and $\Sigma 2$ are switched via multiplexer MX1), and difference signals $\Delta 1$ and $\Delta 2$ are switched, via multiplexer MX2 and digital phase shifter DPS, to a common coupler K and are superposed therein. The amplitude modulated multiplex signal appearing at the output of coupler K is converted in a mixer M1. Mixer M1 is controlled by an oscillator OS whose frequency can be switched so that the different beacon signal frequencies are converted to the same frequency. The amplitude modulated signal present at output a of Mixer M1 is finally processed further in a circuit as shown in FIGS. 7.

Referring to FIG. 9, if the beacon signal frequencies lie very far apart (e.g. one beacon at 30 GHz and another one at 14 GHz), the sum and difference signals $\Sigma 3$ and $\Delta 3$ and $\Sigma 4$ and $\Delta 4$, respectively, derived from the respective beacon signal are superposed on one another separately for each antenna A3 and A4. A mixer M3 controlled by an oscillator OS3, converts the superposed signal $\Sigma 3 + \Delta 3$ to the same frequency as a mixer M4 controlled by oscillator OS4 converts the superposed signal $\Sigma 4 + \Delta 4$. The identical-frequency amplitude modulated signals present at the outputs of mixers M3 and M4 are now switched through by a multiplexer MX3 to a circuit as shown in FIG. 7.

A logarithmizing amplifier can be realized by the integrated circuit No. 8048 CCDE from INTERTIL.

The microprocessor MP can be of the type 8051 from INTEL.

It will be understood that the above description of the present invention is susceptible to various modifications, changes and adaptations, and the same are intended to be comprehended within the meaning and range of equivalents of the appended claims.

What is claimed is:

1. In a method for producing antenna follow-up signals to track another antenna which emits a beacon signal, the method including: deriving, with the use of a mode coupler connected to the tracking antenna, a sum signal and at least one difference signal from the beacon signal received by the tracking antenna; subjecting the difference signal to cyclical changes in phase; superposing the difference signal as it passes through the different phase states on the sum signal to produce an amplitude modulated signal; and determining whether the amplitude modulated signal is subjected to a positive or negative change in amplitude during the change of the difference signal from one phase to another and the amount by which the amplitude modulated signal changes; the improvement comprising:

converting the amplitude modulated signal into another frequency by means of a mixer which receives the amplitude modulated signal and a mixing signal;

feeding the converted amplitude modulated signal to an amplitude detector via a narrowband bandpass filter which permits only the frequency of the converted amplitude modulated signal to pass, the amplitude detector producing an output signal corresponding to the amplitude of the amplitude modulated signal;

cyclically switching a voltage controlled oscillator to produce a signal which cyclically changes its frequency between two frequencies for the duration of each phase state of the difference signal and feeding the signal produced by the voltage controlled oscillator to the mixer as the mixing signal, the converted signal at the output of the mixer changing its frequency between two further frequencies in response to the change of frequency of the mixing signal; and controlling the voltage controlled oscillator with a control voltage that is derived from a difference between attenuations suffered by the converted amplitude modulated signal in the bandpass filter at the two further frequencies of such converted signal.

2. Method as defined in claim 1, including logarithmizing the output signal of the amplitude detector.

3. Method as defined in claim 1, wherein a plurality of tracking antennas exists, each of which receives the beacon signal and said steps of deriving, subjecting, and superposing are applied to the beacon signal as received by each of the tracking antennas to produce a plurality of amplitude modulated signals, and said method further comprises multiplexing the plurality of amplitude modulated signals and applying the multiplexed signals to the mixer.

* * * * *